(12) United States Patent
Moodie et al.

(10) Patent No.: US 11,342,749 B1
(45) Date of Patent: May 24, 2022

(54) INTEGRATION OF A POWER FLOW CONTROL UNIT

(71) Applicant: Smart Wires Inc., Union City, CA (US)

(72) Inventors: Andrew Moodie, Union City, CA (US); Nasrin Taheri-Nassaj, Foster City, CA (US); Ali Farahani, Yorba Linda, CA (US); Antonio Ginart, Santa Clarita, CA (US)

(73) Assignee: Smart Wires Inc., Union City, CA (US)

( * ) Notice: Subject to any disclaimer, the term of this patent is extended or adjusted under 35 U.S.C. 154(b) by 87 days.

(21) Appl. No.: 16/800,999

(22) Filed: Feb. 25, 2020

Related U.S. Application Data

(60) Provisional application No. 62/939,469, filed on Nov. 22, 2019.

(51) Int. Cl.
*H02M 1/12* (2006.01)
*H02J 3/18* (2006.01)
*H02J 3/16* (2006.01)

(52) U.S. Cl.
CPC .............. *H02J 3/1814* (2013.01); *H02J 3/16* (2013.01)

(58) Field of Classification Search
CPC .................................. H02J 3/16; H02J 3/1814
See application file for complete search history.

(56) References Cited

U.S. PATENT DOCUMENTS

| | | | |
|---|---|---|---|
| 5,250,977 A | 10/1993 | Tanaka | |
| 5,345,375 A * | 9/1994 | Mohan | H02J 3/01 307/105 |
| 5,602,446 A | 2/1997 | Kolber et al. | |
| 5,640,623 A | 6/1997 | Sasaki | |
| 5,661,625 A | 8/1997 | Yang | |
| 5,905,646 A | 5/1999 | Crewson et al. | |
| 5,930,122 A | 7/1999 | Moriguchi et al. | |
| 6,373,232 B1 | 4/2002 | Mano et al. | |
| 6,809,571 B2 | 10/2004 | Grasso et al. | |
| 7,132,808 B1 | 11/2006 | Thexton et al. | |
| 7,268,515 B1 | 9/2007 | Tsai et al. | |
| 7,782,643 B2 | 8/2010 | Hara et al. | |
| 8,456,138 B2 | 6/2013 | Lei et al. | |
| 8,471,381 B2 | 6/2013 | Owyang et al. | |
| 8,928,138 B2 | 1/2015 | Owyang et al. | |
| 9,093,359 B2 | 7/2015 | Owyang et al. | |
| 9,199,327 B2 | 12/2015 | Xu et al. | |
| 9,401,705 B2 | 7/2016 | Kohama et al. | |
| 2003/0062947 A1 | 4/2003 | Grasso et al. | |
| 2007/0063340 A1 | 3/2007 | Owyang et al. | |
| 2007/0063341 A1 | 3/2007 | Owyang et al. | |

(Continued)

*Primary Examiner* — Jared Fureman
*Assistant Examiner* — Esayas G Yeshaw
(74) *Attorney, Agent, or Firm* — Womble Bond Dickinson (US) LLP

(57) ABSTRACT

A power flow control unit has one or more impedance injection units. The impedance injection unit has high current drivers and capacitors forming a capacitor bank, and a cooling plate. The cooling plate is thermally coupled to the high current drivers and thermally decoupled from the capacitor bank. Bus bars connect the impedance injection units in series with a power transmission line. The power flow control unit is configurable to inject into the power transmission line a reactive power of at least one MVAr (mega volt-ampere reactive).

20 Claims, 4 Drawing Sheets

(56) References Cited

U.S. PATENT DOCUMENTS

| | | |
|---|---|---|
| 2009/0059633 A1 | 3/2009 | Hara et al. |
| 2010/0219519 A1 | 9/2010 | Owyang et al. |
| 2010/0232106 A1* | 9/2010 | Kauranen .......... H05K 7/20918 |
| | | 361/692 |
| 2012/0013271 A1 | 1/2012 | Lei et al. |
| 2014/0209586 A1 | 7/2014 | Xu et al. |
| 2014/0313626 A1 | 10/2014 | Wang |
| 2014/0362981 A1* | 12/2014 | Koshy ...................... H04B 3/30 |
| | | 379/93.06 |
| 2015/0043263 A1* | 2/2015 | Diber ...................... H02M 1/40 |
| | | 363/140 |
| 2015/0331438 A1 | 11/2015 | Owyang et al. |
| 2015/0382501 A1* | 12/2015 | Horiuchi ............... H02M 7/539 |
| | | 363/131 |
| 2017/0229937 A1* | 8/2017 | Pedersen ................. H01F 27/28 |
| 2019/0067990 A1* | 2/2019 | Hermans ................. H02J 9/065 |
| 2019/0157986 A1* | 5/2019 | Ginart ................ H02M 3/1584 |

\* cited by examiner

INTEGRATION OF A POWER FLOW CONTROL UNIT

CROSS-REFERENCE TO RELATED APPLICATIONS

This application claims benefit of priority from U.S. Provisional Application No. 62/939,469 filed Nov. 22, 2019, which is hereby incorporated by reference.

TECHNICAL FIELD

This disclosure relates to the integration of devices in a power flow control unit, including two or more impedance injection units, each injection unit including a power switching assembly employing high current switching devices, bus bars, a DC capacitor bank, a cooling plate and a conductive mount tray.

BACKGROUND

Components of power flow control systems may be operated outdoors, and their mounting methods and cooling approaches preferably enable reliable operation across a wide range of operating and environmental conditions. Additionally, the orientation of certain components may be critical to withstanding vibration and shock. Therefore, there is a need in the art for improvements.

SUMMARY

A power flow control unit incorporating two or more impedance injection units is desirably compact, lightweight, and operable with low maintenance requirements and high reliability over a period of years in an outdoors environment.

In one embodiment, a power flow control unit has one or more impedance injection units. Each impedance injection unit includes a plurality of high current drivers and a plurality of capacitors forming a capacitor bank. A cooling plate is thermally coupled to the plurality of high current drivers and thermally decoupled from the capacitor bank. Bus bars connect the one or more impedance injection units in series with a power transmission line. The power flow control unit is configurable to inject reactive power into the power transmission line.

In one embodiment, a method is for integrating a power flow control unit. The method includes arranging at least one wall of the power flow control unit as at least one cooling plate. The method includes thermally coupling at least one capacitor bank to a mounting assembly that is thermally decoupled from the at least one cooling plate. The method includes thermally coupling at least one plurality of high current switches to the at least one cooling plate. The method includes connecting components, including the at least one plurality of high current switches, using busbars. The power flow control unit is operable to connect in series with a power transmission line and inject reactive power into the power transmission line.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A power flow control unit is described, wherein opposite walls of the unit are configured as cooling plates. Each cooling plate serves as a surface for cooling high current switching devices such as IGBTs (insulated gate bipolar transistors) that perform power switching of an injected impedance. High current bus bars having both solid and flexible braided portions connect between components including IGBTs, capacitor banks, current limiting DMCs (dual mode chokes or differential mode chokes), current sensors, and transmission line inputs and outputs. The power flow control unit is compact. It may support bus bar currents up to 1800 A RMS and voltages up to 800 volts with the thermal architecture supporting reliable operation over periods of years.

Figure 1:
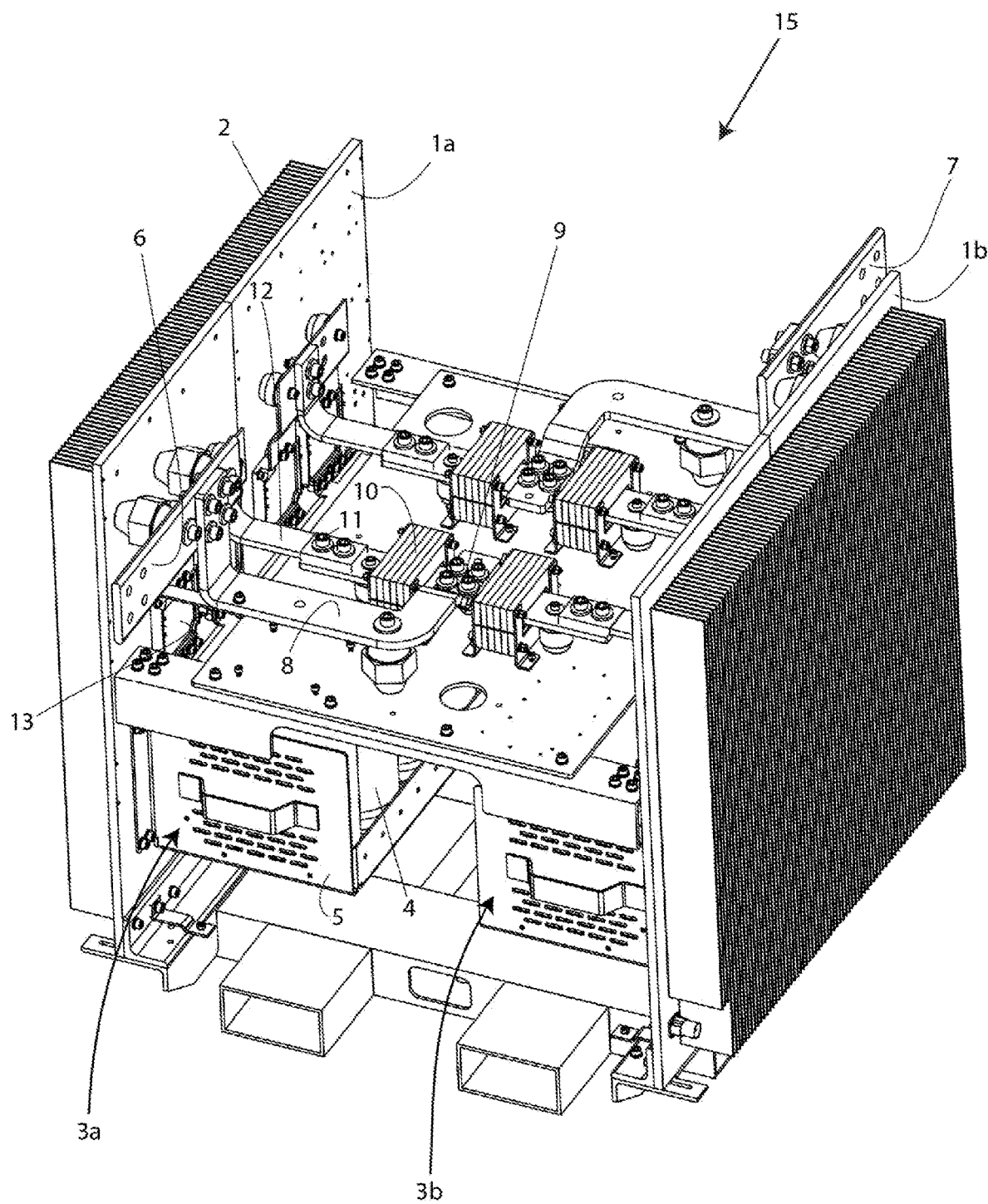
FIG. 1 is an isometric drawing of a power flow control unit having two embedded impedance injection units in an embodiment.

FIG. 1 depicts a power flow control unit 15 in an example embodiment. Cooling plates 1a and 1b are shown, comprising two opposite walls of the unit. In FIG. 1 two impedance injection units are implemented, operating in series. The number of cooling plates (together with the components mounted thereon) may number between 1 and 6 in different embodiments. In one embodiment, the power flow control unit has pairs of opposing walls, where each unit of the pair may be a mirror image of the other unit. In one embodiment, the power flow control unit could have one to six impedance injection units. Portions 2 of each cooling plate are finned, providing an air-cooled surface. Cooling plates 1a and 1b may be fabricated from aluminum extrusions for example.

A first and second bank 3a, 3b of capacitors are shown, each comprising a plurality of capacitors such as capacitor 4. The total capacitance in each bank may total around, for example, 0.1 mF. A positive terminal at the top of each capacitor connects to a positive bus bar (not shown), and similarly a negative terminal connects to a negative bus bar (not shown). A conductive mount tray 5 holds the capacitors 4 of the first capacitor bank. A grounding stud (not shown) may be used at the base of each capacitor to connect the case of the capacitor to the conductive mount tray 5. The mount tray may be fabricated from stainless steel for example, and the cooling plate 1a may be fabricated from aluminum.

The physical configuration shown supports a strong electrical coupling between the IGBT drivers that charge and discharge the capacitors 4 of capacitor bank 3a, while simultaneously providing a weak thermal coupling between cooling plate 1a that cools the IGBT drivers of a first impedance injection unit, and the conductive mount tray 5 that holds the capacitors 4 of the associated capacitor bank. With regard to the strong electrical coupling, it is preferable for capacitive bank 3a to be close to the associated IGBT drivers in order to minimize the inductance between them. The weak thermal coupling between cooling plate 1*a* and conductive mount tray 5 enables the associated IGBT drivers and the capacitors 4 to operate simultaneously at substantially different temperatures. This is useful because the IGBTs typically run hot when switching currents of several hundred amperes RMS; the temperature of a cooling plate such as 1*a* may rise accordingly. Capacitors 4 typically have a longer lifetime when operated at a lower temperature. By employing this optimized thermal architecture, a lifetime of years may be achieved for the power flow control unit.

An output bus bar 6 connects to one side of a power transmission line, and an input bus bar 7 connects to the other side of the power transmission line. A solid bus bar 8 is shown and a current splitting node 9, to be further described. A dual mode choke (DMC) 10 is shown surrounding a solid bus bar connected to current splitting node 9, the solid bus bar attached using solid copper ferrules 11 to a bus bar 12 comprising braided copper wires. The braided copper wires have flexibility to accommodate manufacturing tolerances encountered during alignment and assembly of the various components, and also to accommodate thermal expansion/contraction effects. The braided copper wires may be attached to the solid bus bars using crimped solid copper ferrules. An insulated-gate bipolar transistor (IGBT) module 13 is shown thermally coupled to cooling plate 1*a*; module 13 may contain a plurality of IGBT devices. Other high current switching devices may be used in place of the IGBTs.

Figure 2:
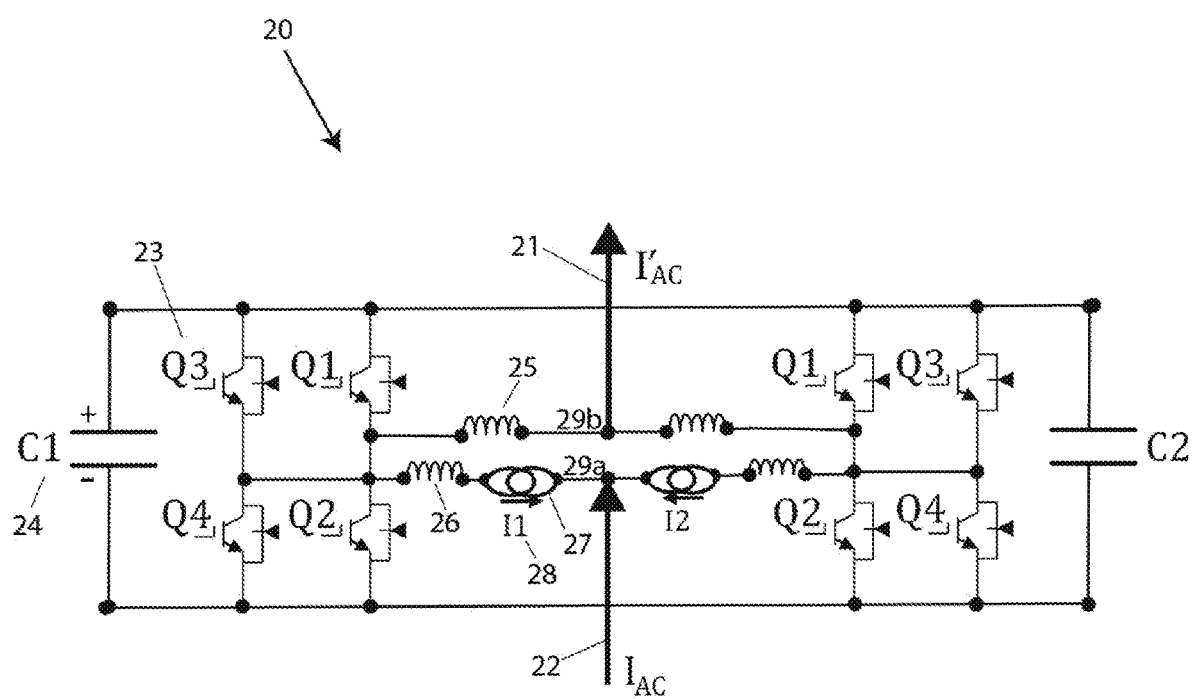
FIG. 2 is a schematic drawing of the power flow control unit of FIG. 1, including connections to a power transmission line.

FIG. 2 is a circuit diagram of the power flow control unit 15 of FIG. 1. The circuit has two halves symmetrically arranged; for simplicity only one half will be described. The two halves may be substantially mirror images of one another with regard to the symmetrical placement of components. Output 21 and input 22 to a power transmission line are shown, and these nodes (output 21 and input 22) associate with bus bars 6 and 7 of FIG. 1. The power transmission line carries the line current, IAC. A DC capacitor 24 (C1) is shown with positive and negative terminals. The value of DC capacitor 24 may be around 0.1 mF as previously described, representing the total capacitance in capacitance bank 3*a* for example. Dual mode chokes (DMCs) 25 and 26 are shown in the circuit diagram of FIG. 2, and are connected in series with portions of bus bars 6 and 7 of FIG. 1 in some embodiments. Each DMC may have an air core or a magnetic core. The positive terminal of DC capacitor 24 connects to terminals of IGBTs Q1 and Q3 as shown. The negative terminal of DC capacitor 24 connects to terminals of IGBTs Q2 and Q4 as shown. A current sensor 27 measures current 28 (Ii) sourcing or sinking from capacitor C1.

Figure 3:
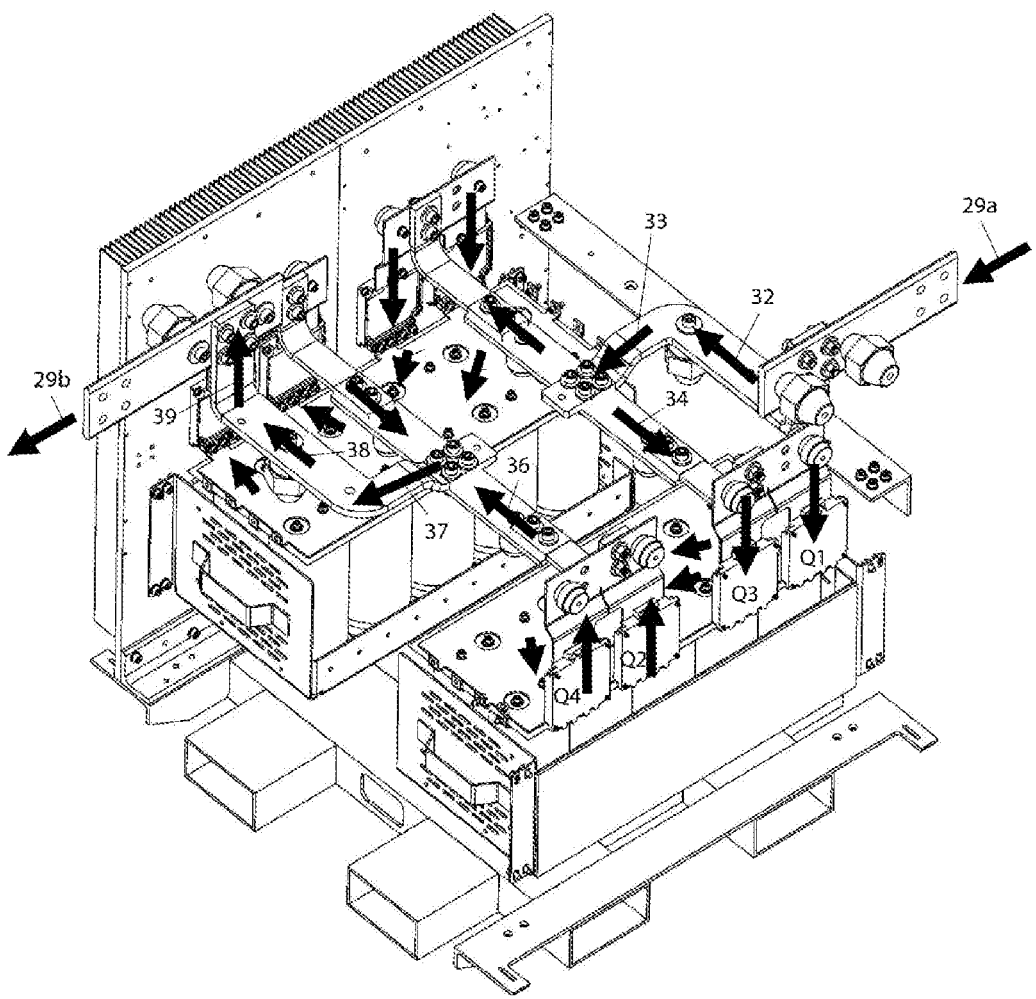
FIG. 3 is an isometric cut-away view of the power flow control unit of FIG. 1 showing current flows.

FIG. 3 will be used to discuss example current paths flowing in power flow control unit 15. Line current of a power transmission line enters at 29*a* and exits at 29*b*. From node 29*a* the current flows 32 through a solid copper bus bar to current splitting node 9, and from there flows 34 to the positive terminal of C1 and connects to IGBTs Q1 and Q3. IGBTs Q1 and Q3 inject reactive power into the transmission line in accordance with an overall plan for managing power flow using power flow control unit 15 and its embedded impedance injection units. The current continues to flow 36 to a second current splitting node as shown, and from there 37 and 38 and 39 to transmission line connection 29*b*. It is apparent from the figure that a second set of current flows can be described as a mirror image of the current flows described above. In this manner a single physical unit (power flow control unit 15) may implement current flows for two impedance injection units as shown. Following the principles described herein, the number of impedance injection units implemented in a single physical unit may vary from 1 to 4.

Figure 4:
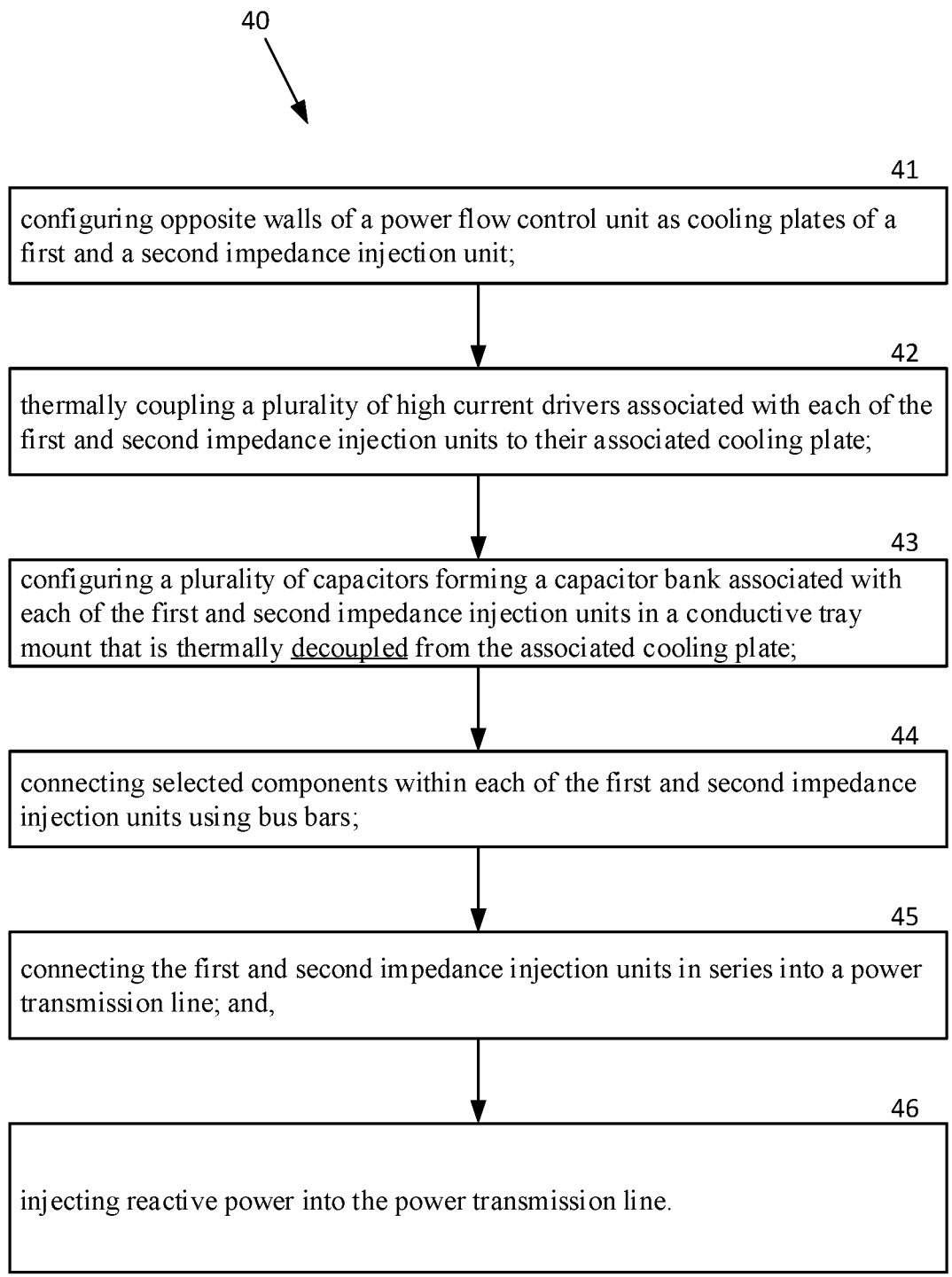
FIG. 4 is a flow chart of an example method for integrating and operating a power flow control unit according to one embodiment.

FIG. 4 is a flow chart of an example method for configuring a plurality of impedance injection units in a single physical unit comprising a power flow control unit according to one embodiment. In step 41 walls of a first and a second impedance injection unit are configured as cooling plates. A plurality of high current drivers associated with each impedance injection unit is thermally coupled to its associated cooling plate in step 42. In step 33 a plurality of capacitors forming a capacitor bank associated with each impedance injection unit is configured on a conductive mount tray that is thermally decoupled (i.e., thermally insulated) from the cooling plate of the associated impedance injection unit. In step 44 selected components of each impedance injection unit are connected using bus bars, and in step 45 the two impedance injection units are connected in series with a power transmission line. Finally, in step 46, injecting reactive power into the power transmission line. In one embodiment, 0-1 MVAr (mega volt-ampere reactive) may be injected. In a modified embodiment, reactive power up to 10 MVAr may be injected by increasing the current carrying capacity of all of the components described herein.

The method for integrating multiple impedance injection units in a single power flow control unit can be broadened to include 2n impedance injection units, where each impedance injection unit is associated with a separate plurality of high current switches attached to a separate cooling plate and a separate capacitor bank. Each 2n combination comprises n pairs of opposing walls of the power flow control unit. As examples, rectangular power flow control units with 4 walls, hexagonal units with 6 walls, and octagonal units with 8 walls could all be considered. Furthermore, the components associated with each opposing wall of a pair of walls may advantageously be arranged in mirror image formation.

What is claimed is:

1. A power flow control unit comprising:
   one or more impedance injection units, each impedance injection unit comprising a plurality of high current drivers and a plurality of capacitors forming a capacitor bank;
   a cooling plate, thermally coupled to the plurality of high current drivers and thermally decoupled from the capacitor bank; and
   bus bars to connect the one or more impedance injection units in series with a power transmission line, with the power flow control unit configurable to inject reactive power into the power transmission line.

2. The power flow control unit of claim 1, wherein the reactive power injected into the power transmission line is at least one MVAr (mega volt-ampere reactive).

3. The power flow control unit of claim 1, further comprising:
   a plurality of differential mode chokes each in series with one of the bus bars.

4. The power flow control unit of claim 1, further comprising:
   a plurality of differential mode chokes each comprising an air core.

5. The power flow control unit of claim 1, further comprising:
   a plurality of differential mode chokes each comprising a core of magnetic material.

6. The power flow control unit of claim 1, wherein each of the one or more impedance injection units utilizes a wall of the power flow control unit as a cooling plate.

7. The power flow control unit of claim 1, wherein the bus bars include at least a portion of braided copper wires that provides flexibility and adaptability to manufacturing tolerances.

8. The power flow control unit of claim 1, wherein the cooling plate comprises aluminum.

9. The power flow control unit of claim 1, wherein the bus bars comprise at least a portion of braided copper wires terminated with crimped solid copper ferrules.

10. The power flow control unit of claim 1 wherein the one or more impedance injection units comprises two to six impedance injection units.

11. A method for integrating a power flow control unit, comprising:
    arranging at least one wall of the power flow control unit as at least one cooling plate;
    thermally coupling at least one capacitor bank to a mounting assembly that is thermally decoupled from the at least one cooling plate;
    thermally coupling at least one plurality of high current switches to the at least one cooling plate; and
    connecting components, including the at least one plurality of high current switches, using bus bars, wherein the power flow control unit is operable to connect in series with a power transmission line and inject reactive power into the power transmission line.

12. The method of claim 11, further comprising:
    connecting differential mode chokes in series with one or more portions of the bus bars.

13. The method of claim 11, wherein the at least one wall comprises one to six walls, each wall associated with a corresponding capacitor bank and a corresponding plurality of high current switches.

14. The method of claim 11, wherein the connecting components using bus bars comprises connecting to at least one of the components using braided copper wires.

15. The method of claim 11, wherein at least one termination of the bus bars comprises a crimped solid copper ferrule.

16. The method of claim 11, wherein the at least one cooling plate comprises a finned region for air cooling.

17. The method of claim 11, wherein the at least one cooling plate comprises one to four cooling plates.

18. The method of claim 11, wherein the at least one wall comprises a plurality of pairs of opposing walls.

19. The method of claim 11, wherein the at least one wall comprises a plurality of pairs of opposing walls, each of the opposing walls having a set of high current switching devices, a capacitor bank, and bus bars, arranged in a mirror image configuration.

20. The method of claim 11, wherein the reactive power to inject into the power transmission line is at least one MVAr (mega volt-ampere reactive).

* * * * *